(12) United States Patent
Yu et al.

(10) Patent No.: US 11,759,792 B2
(45) Date of Patent: Sep. 19, 2023

(54) METHOD FOR POWER BATTERY AUTOMATIC FINE-QUANTITY SORTING AND APPARATUS THEREOF

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

(72) Inventors: Haijun Yu, Guangdong (CN); Ting Peng, Guangdong (CN); Yinghao Xie, Guangdong (CN); Shumin Liu, Guangdong (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN, BRUNP EV RECYCLING CO., LTD., Changsha (CN)

( * ) Notice: Subject to any disclaimer, the term of this patent is extended or adjusted under 35 U.S.C. 154(b) by 0 days.

(21) Appl. No.: 18/041,402

(22) PCT Filed: May 13, 2021

(86) PCT No.: PCT/CN2021/093662
§ 371 (c)(1),
(2) Date: Feb. 10, 2023

(87) PCT Pub. No.: WO2022/033096
PCT Pub. Date: Feb. 17, 2022

(65) Prior Publication Data
US 2023/0234074 A1 Jul. 27, 2023

(30) Foreign Application Priority Data

Aug. 11, 2020 (CN) .......................... 202010802939.5

(51) Int. Cl.
*B03C 1/30* (2006.01)
*H01M 10/54* (2006.01)
(Continued)

(52) U.S. Cl.
CPC .................. *B03C 1/30* (2013.01); *B03B 9/06* (2013.01); *B03C 1/18* (2013.01); *B03C 7/08* (2013.01);
(Continued)

(58) Field of Classification Search
CPC .... B03C 1/18; B03C 1/30; B03C 7/08; B03C 2201/20; B03B 3/35; B03B 9/06; B03B 2009/066; B09B 2101/16; H01M 10/54
See application file for complete search history.

(56) References Cited

U.S. PATENT DOCUMENTS

2004/0028585 A1    2/2004    Cardarelli et al.
2014/0106185 A1    4/2014    Kruglick

FOREIGN PATENT DOCUMENTS

CN    102569940 A    7/2012
CN    105226344 A    1/2016
(Continued)

OTHER PUBLICATIONS

First Office Action in Chinese patent Application No. 202010802939.5 dated May 8, 2021.
(Continued)

*Primary Examiner* — Michael McCullough
*Assistant Examiner* — Kalyanavenkateshware Kumar
(74) *Attorney, Agent, or Firm* — Buchalter; Jason W. Croft

(57) ABSTRACT

The present invention discloses a method for power battery automatic fine-quantity sorting and an apparatus thereof, the
(Continued)

method including the following steps of S1. The material is crushed, and leveled, and is then subjected to magnetic sorting processing to sort out iron powder; S2. The material after magnetic sorting is subjected to electrostatic processing to sort out positive electrode material powder; S3. The material after electrostatic processing is subjected to bounce processing to sort out the collector and graphite powder. A magnetic sorting device, an electrostatic sorting device, and a bouncing sorting device are accordingly provided.

10 Claims, 1 Drawing Sheet

(51) Int. Cl.
    *B09B 3/35*         (2022.01)
    *B03C 7/08*         (2006.01)
    *B03B 9/06*         (2006.01)
    *B03C 1/18*         (2006.01)
    *B09B 101/16*     (2022.01)

(52) U.S. Cl.
    CPC ............... *B09B 3/35* (2022.01); *H01M 10/54* (2013.01); *B03B 2009/066* (2013.01); *B03C 2201/20* (2013.01); *B09B 2101/16* (2022.01)

(56) References Cited

FOREIGN PATENT DOCUMENTS

| | | |
|---|---|---|
| CN | 105826629 A | 8/2016 |
| CN | 106450555 A | 2/2017 |
| CN | 106654435 A | 5/2017 |
| CN | 106972215 A | 7/2017 |
| CN | 107086334 A | 8/2017 |
| CN | 207057008 U | 3/2018 |
| CN | 108110364 A | 6/2018 |
| CN | 207507652 U | 6/2018 |
| CN | 109174452 A | 1/2019 |
| CN | 109193064 A | 1/2019 |
| CN | 109524739 A | 3/2019 |
| CN | 110061320 A | 7/2019 |
| CN | 108940428 B | 3/2020 |
| CN | 213212216 U | 5/2021 |
| CN | 112086702 B | 12/2021 |
| TW | 478395 U | 5/2014 |
| WO | 2022033096 A1 | 2/2022 |

OTHER PUBLICATIONS

International Search Report in PCT/CN2021/093662 dated Jun. 24, 2021.
Supplementary Search in Chinese patent Application No. 202010802939.5 dated Sep. 28, 2021.

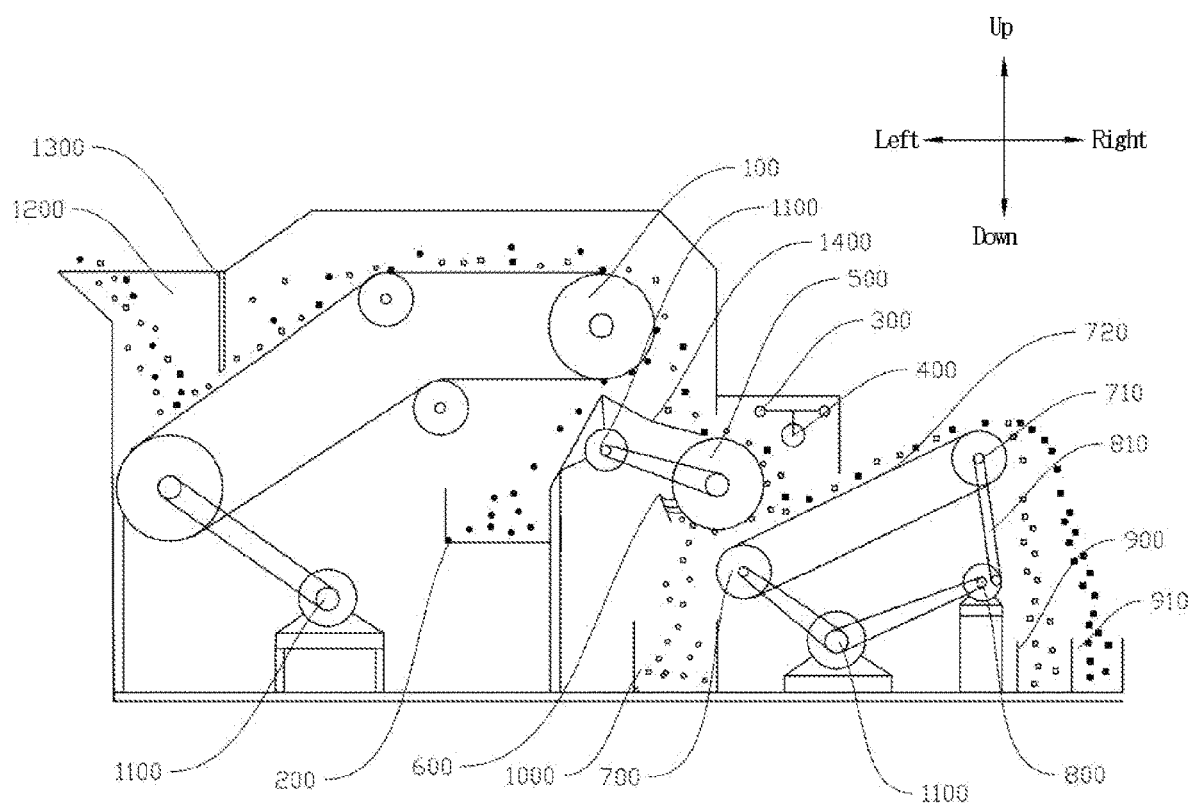

METHOD FOR POWER BATTERY AUTOMATIC FINE-QUANTITY SORTING AND APPARATUS THEREOF

CROSS-REFERENCE TO RELATED APPLICATION

This application is a national stage filing under 35 U.S.C. § 371 of international application number PCT/CN2021/093662, filed May 13, 2021, which claims priority to Chinese patent application No. 202010802939.5, filed August 11. The contents of these applications are incorporated herein by reference in their entirety.

TECHNICAL FIELD

The present invention relates to the technical field of recycling the waste lithium battery, and more particularly, to a method for power battery automatic fine-quantity sorting and an apparatus thereof.

BACKGROUND

Under the circumstance of massive growth of retired power batteries and strict requirements on current environmental protection laws and regulations, higher requirements are put forward for power battery recycling and resourcing process. However, the sorting of materials after the power battery being crushed is always a troublesome problem during the actual recycling process, and the sorting of materials with higher precision is even more difficult to break through.

Waste lithium batteries contain a large amount of non-renewable metal resources with high economic values, such as cobalt, lithium, nickel, copper, aluminum and others. If the waste or unqualified lithium batteries can be effectively recycled, it can not only reduce the pressure of waste file batteries on the environment, but also can avoid the waste of metal resources such as cobalt, nickel and others. Pre-processing the waste lithium batteries of the current recycling technology route includes discharging, disassembly, comminution and sorting. Wherein, the sorting is the difficulty in the process of pre-processing, especially the higher requirements on the precision of the powder obtained after the sorting, Therefore, a single sorting means, such as window sorting and magnetic sorting, are difficult to meet the current production requirements. Therefore, with respect to such requirements, it is necessary to design a special process to configure a corresponding apparatus and sort the powder materials of the power battery with the combination of two.

The sorting process of crushed powder materials of the traditional lithium battery generally only relates to a single sorting method, such as "waste lithium battery sorting and recycling equipment" (CN108940428B) and "wind sorting apparatus for waste lithium battery anode material" (CN207057008U). However, this traditional sorting method cannot effectively sort according to the type of the materials, but can only sort according to the size of the materials. The technology is relatively backward.

SUMMARY

The present invention intends to solve at least one of the technical problems in the current technology. For this purpose, the present invention provides a method for power battery automatic fine-quantity sorting and apparatus thereof, which can realize the high-purity separation of copper, iron, aluminum, graphite, positive electrode material, and other materials in the crushed materials of the waste battery.

To achieve the above purposes, the present invention adopts the following technical solution:

A method for power battery automatic fine-quantity sorting comprises the steps of:
  S1. The material is crushed, and leveled, and is then subjected to magnetic sorting processing to sort out iron powder;
  S2. The material after magnetic sorting is subjected to electrostatic processing to sort out the positive electrode material powder;
  S3. The material after electrostatic processing is subjected to bounce processing to sort out the collector and graphite powder.

Preferably, in step S1, the stack thickness of the leveled material is 0.8-1 mm Preferably, in step S2, the voltage of the electrostatic processing is 10-30 kV.

During the electrostatic processing, due to the difference of material conductivity, the negative charge on the conductor particles (graphite powder, collector powder) with poor dielectric properties is quickly conducted away by the grounded electrode, therefore the conductor particles have a positive charge; however, non-conductive particles (positive electrode material powder) have no such effect, therefore the positive electrode material powder can be obtained.

A sorting apparatus based on the method for power battery automatic fine-quantity sorting, along the direction of material transmission, successively is provided with:
  A magnetic sorting device, including a permanent magnet rolling wheel, an iron powder hopper is provided at the lower left of the permanent magnet rolling wheel;
  An electrostatic sorting device, located at the lower right of the permanent magnet rolling wheel, including a grounded roller electrode, a corona electrode, and a static electrode are successively provided at the upper right of the roller electrode, and a brush in contact with the roller electrode is provided at the lower left;
  A bouncing sorting device, located at the lower right of the roller electrode, including a drive wheel, a driven wheel and a conveyor belt, a deflecting wheel, and a carrier rod is provided below the driven wheel, one end of the carrier rod is connected to the deflecting wheel to form an eccentric wheel mechanism, and the other end is connected to the driven wheel.

Preferably, the sorting apparatus also includes a feed inlet and a scraper provided between the feed inlet and the permanent magnet rolling wheel.

Preferably, an inclined guide plate is provided between the permanent magnet rolling wheel and the roller electrode.

Preferably, a positive electrode material powder hopper is provided below the brush.

Preferably, the driving wheel and the deflecting wheel are driven by the same motor.

Preferably, a collector hopper and a graphite powder hopper are provided successively at the lower right of the driven wheel.

Preferably, the rotating speed of the permanent magnet rolling wheel is 0.05-0.2 m/s.

Preferably, the linear speed of the conveyor belt is 0.1-0.3 m/s and the amplitude of the driven wheel is 0.1-0.15 m.

Preferably, the rotating speed of the roller electrode is 500-1000 r/min.

Beneficial Effects:
1. The present invention adopts the combination of three methods of magnetic sorting, electrostatic processing, and bouncing processing to realize the high-purity separation of copper, iron, aluminum, graphite and positive electrode material in the crushed materials of the waste battery, and solve the difficult problem in the traditional method that the metal entraining and positive and negative electrode material powders cannot be effectively separated.
2. The sorting apparatus in the present invention adopts the electrostatic sorting technology, which can effectively separate conductor and non-conductor powders and obtain lower impurity content.
3. The sorting apparatus in the present invention adopts the bouncing sorting technology, which reduces the influence of dust on material purity compared with the traditional method.

BRIEF DESCRIPTION OF THE DRAWINGS

The above and/or additional aspects and advantages of the present invention may be understood with the description of the embodiments in combination with the following FIGURES, wherein:

FIG. 1 is a schematic diagram of an overall structure of a sorting apparatus of the present invention.

Reference numerals: permanent magnet rolling wheel 100, iron powder hopper 200, corona electrode 300, electrostatic electrode 400, roller electrode 500, brush 600, drive wheel 700, driven wheel 710, conveyor belt 720, deflecting wheel 800, carrier rod 810, collector hopper 900, graphite powder hopper 910, positive electrode material powder hopper 1000, motor 1100, feed inlet 1200, scraper 1300, and guide plate 1400.

DETAILED DESCRIPTION

The present invention is more specifically illustrated in combination with the embodiments. The embodiments of the present invention are not limited to the following embodiments and variations and changes of the present invention in any forms shall all be within the scope of the present invention.

In the description of the present invention, it should be understood that the azimuth description, such as azimuth or location relationship indicated by up, down, front, back, left, and right, is based on the azimuth or location relationship shown in the Drawings, and is only for the convenience of the description of the present invention and for simplifying the description, but not indicates or suggests that the apparatus or component indicated must have a particular azimuth or is constructed or operated in a particular azimuth, therefore, shall not be construed as a limitation to the present invention.

In the description of the present invention, unless otherwise well defined, terms such as provide, install and connect shall be interpreted in a broad sense, and those skilled in the art can reasonably determine the specific meanings of the above terms in the present invention in combination with the specific contents of the technical solution.

Referring to FIG. 1, a method for power battery automatic fine-quantity sorting, comprises the following steps of:
S1. The material is crushed and leveled to the stack thickness of 0.8-1 mm, and then is subjected to magnetic sorting processing to sort out iron powder.
S2. The material after magnetic sorting is subjected to electrostatic processing at the voltage of 10-30 kV to sort out the positive electrode material powder;
S3. The material after electrostatic sorting is subjected to a bounce processing to sort out the collector and graphite powder.

During the electrostatic processing, due to the difference of material conductivity, the negative charge on the conductor particles (graphite powder, collector powder) with poor dielectric properties is quickly conducted away by the grounded electrode, therefore the conductor particles have a positive charge; however, non-conductive particles (positive electrode material powder) have no such effect, therefore the positive electrode material powder can be obtained.

A sorting apparatus based on the method for power battery automatic fine-quantity sorting, along the direction of material transmission successively is provided with:

A magnetic sorting device, including a permanent magnet rolling wheel 100, an iron powder hopper 200 is provided at the lower left of the permanent magnet rolling wheel 100;

An electrostatic sorting device, located at the lower right of the permanent magnet rolling wheel 100, including a grounded roller electrode 500, a corona electrode 300 and a static electrode 400 are provided successively at the upper right of the roller electrode 500, and a brush 600 in contact with the roller electrode 500 is provided at the lower left;

A bouncing sorting device, located at the lower right of the roller electrode 500, including a drive wheel 700, a driven wheel 710 and a conveyor belt 720, a deflecting wheel 800 and a carrier rod 810 are provided below the driven wheel 710, one end of the carrier rod 810 is connected to the deflecting wheel 800 to form an eccentric wheel structure, and the other end is connected to the driven wheel 710.

In some embodiments thereof, the rotating speed of the permanent magnet rolling wheel 100 is 0.05-0.2 m/s.

In some embodiments thereof, the linear speed of the conveyor belt 720 is 0.1-0.3 m/s and the amplitude of the driven wheel 710 is 0.1-0.15 m.

In some embodiments thereof, the rotating speed of the roller electrode 500 is 500-1000 r/min.

In some embodiments thereof, a feed inlet 1200 and a scraper 1300 are also included, the scraper provided between the feed inlet 1200 and the permanent magnet rolling wheel 100. The scraper 1300 is used to level the material to avoid the stacking being too thick to influence the sorting effects.

In some embodiments thereof, an inclined guide plate 1400 is provided between the permanent magnet rolling wheel 100 and the roller electrode 500, the guide plate 1400 having a smooth surface to guide the material slide towards the roller electrode 500.

In some embodiments thereof, a positive electrode material powder hopper 1000 is provided below the brush 600 to contain positive electrode material powders scraped down by the brush 600.

In some embodiments thereof, the driving wheel 700 and the deflecting wheel 800 are driven by the same motor 1100 to reduce unnecessary electric power consumption.

In some embodiments thereof, a collector hopper 900 and a graphite powder hopper 910 are provided successively at the lower right of the driven wheel 710 to contain collector and graphite powder bounced out from the bouncing sorting device.

It should be understood that the crushed mixture material of the lithium battery has different physical properties. Iron has magnetic properties, and the anode material powder is usually nickel cobalt lithium manganese and lithium nickel manganese, having no magnetism or electrical conductivity, while the collector and graphite powder have electrical conductivity. The core of the present invention is to realize physical sorting according to different physical properties of various materials.

Embodiment 1

In one embodiment, a method for power battery automatic fine-quantity sorting, includes:

S1. The crushed material is leveled via the blade edge of scraper 1300 until the stack thickness of the material is 1 mm and is then transported to the magnetic sorting device which includes a permanent magnet rolling wheel 100 with a rotating speed of 0.05 m/s. When the material passes above the permanent magnet rolling wheel 100, the iron powder with magnetism may be firmly absorbed on the rolling wheel until to the lowest point with the permanent magnet rolling wheel 100, the belt is separated from the rolling wheel and iron powder is also separated from the permanent magnet rolling wheel 100 into the iron powder hopper 200 at the lower left, the rest of the material, under the action of gravity and centrifugal force, falls off tangentially from the permanent magnet rolling wheel 100 into the electrostatic sorting device at the lower right;

S2. The material after magnetic sorting is subjected to electrostatic processing, the electrostatic sorting device including a corona electrode 300, a static electrode 400, a roller electrode 500 and brush 600, the corona electrode 300, the static electrode 400 and the brush 600 are located at 1, 2, 9 o'clock direction of roller electrode 500, respectively. The 20 kV high voltage power supply is applied to the corona electrode 300 and the static electrode 400, and the roller electrode 500 is grounded. An electrostatic field is generated between the three electrodes, and materials entering the ionization zone around the corona electrode 300 may be charged. Due to the difference of material conductivity, the negative charge on the conductor particles (graphite powder, collector powder) with poor dielectric properties is quickly conducted away by the grounded roller electrode 500, therefore the conductor particles have a positive charge. However, non-conductive particles (positive electrode material powder) have no such effect. In an electric field, the positive electrode material powder is attached to the surface of the roller electrode 500 by the effect of the imaging force generated on the surface of the roller electrode 500 to be rotated to the 9 o'clock direction. The positive electrode material powder is cleaned by the brush 600 into the positive electrode material powder hopper 1000. Under the action of the electrostatic force, gravity and centrifugal force, the positively charged graphite powder and collector powder fall off tangentially from the roller electrode 500 and fall on the conveyor belt 720 of the bouncing sorting device.

S3. The material after electrostatic sorting is subjected to a bounce processing, the bouncing sorting device comprises a transporting mechanism and a bouncing mechanism, the transporting mechanism comprising a driving wheel 700, a driven wheel 710 and a conveyor belt 720, the linear speed of the conveyor belt 720 is 0.1 m/s, the bouncing mechanism is composed of deflecting wheel 800 and a carrier rod 810 located below the transporting mechanism, One end of the carrier rod 810 is connected to the deflecting wheel 800 and the other end to the driven wheel 710. The deflecting wheel 800 and the drive wheel 700 are driven by the same motor 1100. The rotating of the deflecting wheel 800 drives the carrier rod 810 to move up and down, causing the vibration of the driven wheel 710 at an amplitude of 1 m. The graphite powder and collector powder dropped on the bouncing sorting device are thrown out from the end of the transporting mechanism at different speeds under the influence of density, wherein the lighter graphite powder gets higher speed under the action of vibration, therefore, falls in the graphite powder hopper 910 with a farther horizontal distance, and the heavier collector powder falls in the collector hopper 900 with a closer horizontal distance under the same force condition, and finally the collector and graphite powder are sorted out.

Embodiment 2

The steps of embodiment 2 are the same with those of embodiment 1, the difference is in step S1, the rotating speed of the permanent magnet rolling wheel 100 is 0.1 m/s. The voltage in step S2 is 20 kV and the rotating speed of the roller electrode 500 is 800 r/min; the linear speed of the conveyor belt 720 in step S3 is 0.2 m/s and the amplitude of the driven wheel 710 is 0.12 m/s.

Embodiment 3

The steps of embodiment 3 are the same with those of embodiment 1, the difference is in step S1, the rotating speed of the permanent magnet rolling wheel 100 is 0.2 m/s. The voltage in step S2 is 30 kV and the rotating speed of the roller electrode 500 is 1000 r/min; the linear speed of the conveyor belt 720 in step S3 is 0.2 m/s and the amplitude of the driven wheel 710 is 0.15 m/s.

Comparative Example 1

The wind sorting separating apparatus of the Chinese patent "wind sorting apparatus for waste lithium battery anode material" (CN207057008U) is used for separation.

Comparison of Sorting Effects

Material sorting is performed according to the above embodiment 2 and the comparative example, the obtained materials such as iron powder, positive electrode material powder, collector powder and graphite powder were respectively tested for impurity elements, and the results were shown in Table 1, Table 2, Table 3 and Table 4, respectively. The results show that the impurity content of embodiment 2 is superior to the comparative example.

TABLE 1

Comparison of impurity content of iron powder between embodiment 2 and comparative example 1

| Impurity | Ni/% | Co/% | Mn/% | Li/% | Al/% | Cu/% | C/% |
|---|---|---|---|---|---|---|---|
| Embodiment 2 | 0.1 | 0.3 | 0.1 | 0.1 | 0.1 | 0.1 | 0.3 |
| Comparative example | 1.2 | 0.8 | 0.5 | 2.3 | 1.9 | 0.4 | 4.2 |

As can be seen from Table 1, the impurity content of iron powder obtained by magnetic sorting processing is very low and the magnetic sorting effect is preferable.

TABLE 2

Comparison of impurity content of positive electrode material
powder between embodiment 2 and comparative example 1

| Impurity | C/% | Fe/% | Al/% | Cu/% |
|---|---|---|---|---|
| Embodiment 2 | 0.1 | 0.2 | 0.1 | 0.1 |
| Comparative example | 2.1 | 5.2 | 1.3 | 0.4 |

As can be seen from Table 2, the impurity content of positive electrode material obtained by electrostatic sorting processing is very low and the electrostatic sorting effect is preferable.

TABLE 3

Comparison of impurity content of collector
between embodiment 2 and comparative example 1

| Impurity | Ni/% | Co/% | Mn/% | Li/% | Fe/% | C/% |
|---|---|---|---|---|---|---|
| Embodiment 2 | 0.2 | 0.2 | 0.3 | 0.3 | 0.2 | 0.1 |
| Comparative example | 1.3 | 0.8 | 0.5 | 2.3 | 5.2 | 0.6 |

TABLE 4

Comparison of impurity content of granhite powder
between embodiment 2 and comparative example 1

| Impurity | Ni/% | Co/% | Mn/% | Li/% | Fe/% | Al/% | Cu/% |
|---|---|---|---|---|---|---|---|
| Embodiment 2 | 0.1 | 0.3 | 0.1 | 0.1 | 0.2 | 0.1 | 0.1 |
| Comparative example | 1.3 | 0.8 | 0.5 | 2.3 | 5.1 | 1.3 | 0.4 |

As can be seen from Tables 3-4, the impurity content of the final collector and graphite powder after the magnetic sorting, electrostatic sorting and bouncing sorting processing is very low, indicating that the present invention can achieve high-purity separation.

The above embodiments are preferred embodiments of the present invention, but the embodiments of the present invention are not limited to the above embodiments. Any other changes, modifications or simplifications made without departing from the spirit essence and principle of the present invention shall be deemed as equivalent alternatives and shall be included in the protection scope of the present invention.

What is claimed is:

1. A method for power battery automatic fine-quantity sorting, comprising:
S1. crushing and leveling a material, and performing a magnetic sorting processing to sort out iron powder;
S2. performing an electrostatic processing on the material after being subjected to the magnetic sorting processing to sort out positive electrode material powder;
S3. performing a bounce processing on the material after being subjected to the electrostatic processing to sort out collector and graphite powder, and
wherein, a sorting apparatus based on the method for power battery automatic fine-quantity sorting, along the direction of material transmission, is successively provided with:
a magnetic sorting device, comprising a permanent magnet rolling wheel (100), an iron powder hopper (200) is provided at the lower left of the permanent magnet rolling wheel (100);
an electrostatic sorting device, located at the lower right of the permanent magnet rolling wheel (100), comprising a grounded roller electrode (500), a corona electrode (300) and a static electrode (400) successively provided at the upper right of the roller electrode (500), and a brush (600) in contact with the roller electrode (500) provided at the lower left, the corona electrode (300), the static electrode (400) and the brush (600) are located at 1, 2, 9 o'clock direction of the roller electrode (500) respectively;
a bouncing sorting device, located at the lower right of the roller electrode (500), comprising a drive wheel (700), a driven wheel 710) and a conveyor belt (720), a deflecting wheel (800) and a carrier rod (810) being provided below the driven wheel (700), one end of the carrier rod (810) being connected to the deflecting wheel (800) to form an eccentric wheel mechanism, and the other end being connected to the driven wheel (710).

2. The method of claim 1, wherein, in step S1, a stack thickness of the leveled material is 0.8-1 mm.

3. The method of claim 1, wherein, in step S2, a voltage of the electrostatic processing is 10-30 kV.

4. A sorting apparatus based on a method for power battery automatic fine-quantity sorting, wherein, along the direction of material transmission, successively provided with:
a magnetic sorting device, comprising a permanent magnet rolling wheel (100), an iron powder hopper (200) is provided at the lower left of the permanent magnet rolling wheel (100);
an electrostatic sorting device, located at the lower right of the permanent magnet rolling wheel (100), comprising a grounded roller electrode (500), a corona electrode (300) and a static electrode (400) successively provided at the upper right of the roller electrode (500), and a brush (600) in contact with the roller electrode (500) provided at the lower left; the corona electrode (300), the static electrode (400) and the brush (600) are located at 1, 2, 9 o'clock direction of the roller electrode (500) respectively;
a bouncing sorting device, located at the lower right of the roller electrode (500), comprising a drive wheel (700), a driven wheel (710) and a conveyor belt (720), a deflecting wheel (800) and a carrier rod (810) being provided below the driven wheel (700), one end of the carrier rod (810) being connected to the deflecting wheel (800) to form an eccentric wheel mechanism, and the other end being connected to the driven wheel (710).

5. The sorting apparatus of claim 4, wherein, the sorting apparatus further comprises a feed inlet (1200) and a scraper (1300) provided between the feed inlet (1200) and the permanent magnet rolling wheel (100).

6. The sorting apparatus of claim 4, wherein, an inclined guide plate (1400) is provided between the permanent magnet rolling wheel (100) and the roller electrode (500).

7. The sorting apparatus of claim 4, wherein, a positive electrode material powder hopper (1000) is provided below the brush (600).

8. The sorting apparatus of claim 4, wherein, the driving wheel (700) and the deflecting wheel (800) are driven by a same motor (1100).

9. The sorting apparatus of claim 4, wherein, a collector hopper (900) and a graphite powder hopper (910) are successively provided at the lower right of the driven wheel (710).

10. The sorting apparatus of claim 4, wherein, the rotating speed of the permanent magnet rolling wheel (100) is 0.05-0.2 m/s.

\* \* \* \* \*